US012736994B2

(12) United States Patent

Fei et al.

(10) Patent No.: US 12,736,994 B2
(45) Date of Patent: Sep. 15, 2026

(54) BANDGAP DEVICE AND START-UP CIRCUIT THEREOF

(71) Applicants: Faraday Technology Corporation, Suzhou (CN); Faraday Technology Corp., Hsinchu (TW)

(72) Inventors: Xiao-Dong Fei, Suzhou (CN); Huiwen Hu, Suzhou (CN); San-Yueh Huang, Hsinchu (TW)

(73) Assignees: Faraday Technology Corporation, Suzhou (CN); Faraday Technology Corp., Hsinchu (TW)

( * ) Notice: Subject to any disclaimer, the term of this patent is extended or adjusted under 35 U.S.C. 154(b) by 228 days.

(21) Appl. No.: 18/636,238

(22) Filed: Apr. 15, 2024

(65) Prior Publication Data

US 2025/0284304 A1 Sep. 11, 2025

(30) Foreign Application Priority Data

Mar. 6, 2024 (CN) ......................... 202410256809.4

(51) Int. Cl.
*G05F 3/24* (2006.01)
*G05F 1/46* (2006.01)
*G05F 3/30* (2006.01)

(52) U.S. Cl.
CPC ................ *G05F 3/24* (2013.01); *G05F 1/468* (2013.01); *G05F 3/30* (2013.01)

(58) Field of Classification Search
CPC ... G05F 3/30; G05F 3/24; G05F 3/262; G05F 1/468; G05F 1/575; G05F 1/561;
(Continued)

(56) References Cited

U.S. PATENT DOCUMENTS

2017/0012609 A1* 1/2017 Shen ....................... G05F 3/267
2023/0142312 A1 5/2023 Chen
2024/0012440 A1 1/2024 Chen

FOREIGN PATENT DOCUMENTS

CN 113985957 1/2022
CN 115469708 12/2022
(Continued)

OTHER PUBLICATIONS

"Notice of allowance of Taiwan Counterpart Application", issued on Mar. 4, 2025, p. 1-p. 4.

*Primary Examiner* — Jeffrey A Gblende
*Assistant Examiner* — Ularislao Cordova
(74) *Attorney, Agent, or Firm* — JCIPRNET

(57) ABSTRACT

A bandgap device and a start-up circuit thereof are disclosed. The start-up circuit includes a first transistor, delay circuit, second transistor, switch circuit, and startup switch. Control terminals of first transistor and second transistor are controlled by an internal bias voltage of the bandgap circuit. The delay circuit is coupled to the first transistor. The switch circuit is coupled to the second transistor. The switch circuit is controlled by the delay circuit. A control terminal of startup switch is coupled to the second transistor and the switch circuit. At a power-up instant time of the bandgap circuit, the startup switch is turned on to provide a startup bias to an internal startup node of the bandgap circuit. After the bandgap circuit completes startup, the internal bias voltage of the bandgap circuit turns off the startup switch, the first transistor, and the second transistor, so the start-up circuit consumes no current.

23 Claims, 4 Drawing Sheets

(58) Field of Classification Search
CPC ..... G05F 1/56; G05F 3/08; G05F 3/16; G05F 3/205; G05F 3/267; G05F 3/225; G05F 3/26; G05F 3/265; G05F 3/02; H03K 17/22; H03K 17/223
See application file for complete search history.

(56) References Cited

FOREIGN PATENT DOCUMENTS

| | | |
|---|---|---|
| CN | 115981405 | 4/2023 |
| TW | 201347372 | 11/2013 |
| TW | 202311900 | 3/2023 |

* cited by examiner

BANDGAP DEVICE AND START-UP CIRCUIT THEREOF

CROSS-REFERENCE TO RELATED APPLICATION

This application claims the priority benefit of China application serial no. 202410256809.4, filed on Mar. 6, 2024. The entirety of the above-mentioned patent application is hereby incorporated by reference herein and made a part of this specification.

BACKGROUND

Technical Field

This disclosure relates to an electronic apparatus, and in particular to a bandgap device and a start-up circuit thereof.

Description of Related Art

With the technological development of electronic circuits, electronic apparatuses are required to have low power consumption and low delay functions. Multiple circuits (e.g., bandgap circuits) in an electronic apparatus enter a power-saving mode to reduce standby power consumption when the electronic apparatus is in an idle period. When the idle period is over, all circuits (e.g., bandgap circuits) in the electronic apparatus are expected to be able to start up quickly in order to enter the normal operating state. A bandgap circuit is a circuit used to generate a stable reference voltage. It can output a highly stable, low-noise reference voltage that is not affected by temperature variations. As a result, bandgap circuits are widely used in many precision electronic apparatuses, such as analog-to-digital converter (ADC), digital-to-analog converters (DAC), and measurement system of sensor. The startup time of bandgap circuits often affects the startup speed of electronic apparatuses.

SUMMARY

The disclosure is directed to a bandgap device and a start-up circuit thereof to start a bandgap circuit.

In an embodiment according to the disclosure, the start-up circuit is configured to start a bandgap circuit. The start-up circuit includes a first transistor, a delay circuit, a second transistor, a switch circuit, and a first startup switch. A first terminal of the first transistor is coupled to a first voltage. A control terminal of the first transistor is controlled by a first internal bias voltage of the bandgap circuit. A first terminal of the delay circuit is coupled to a second terminal of the first transistor. A second terminal of the delay circuit is coupled to a second voltage. A first terminal of the second transistor is coupled to a third voltage. A control terminal of the second transistor is controlled by a second internal bias voltage of the bandgap circuit. A first terminal of the switch circuit is coupled to a second terminal of the second transistor. A second terminal of the switch circuit is coupled to a fourth voltage. A control terminal of the switch circuit is controlled by an output terminal of the delay circuit. A first terminal of the first startup switch is coupled to a fifth voltage. A second terminal of the first startup switch is coupled to a first internal startup node of the bandgap circuit. A control terminal of the first startup switch is coupled to the second terminal of the second transistor and the first terminal of the switch circuit.

In an embodiment according to the disclosure, the bandgap device includes a bandgap circuit and a start-up circuit. The bandgap circuit is configured to provide a bandgap voltage. The start-up circuit is coupled to the bandgap circuit. The start-up circuit is configured to start the bandgap circuit. The start-up circuit includes a first transistor, a delay circuit, a second transistor, a switch circuit, and a first startup switch. A first terminal of the first transistor is coupled to a first voltage. A control terminal of the first transistor is controlled by a first internal bias voltage of the bandgap circuit. A first terminal of the delay circuit is coupled to a second terminal of the first transistor. A second terminal of the delay circuit is coupled to a second voltage. A first terminal of the second transistor is coupled to a third voltage. A control terminal of the second transistor is controlled by a second internal bias voltage of the bandgap circuit. A first terminal of the switch circuit is coupled to a second terminal of the second transistor. A second terminal of the switch circuit is coupled to a fourth voltage. A control terminal of the switch circuit is controlled by an output terminal of the delay circuit. A first terminal of the first startup switch is coupled to a fifth voltage. A second terminal of the first startup switch is coupled to a first internal startup node of the bandgap circuit. A control terminal of the first startup switch is coupled to the second terminal of the second transistor and the first terminal of the switch circuit.

Based on the above, at the power-on instant of the bandgap circuit, the second transistor and the switch circuit may turn on the startup switch to provide the startup bias (the startup bias current or the bias voltage) to the internal startup node of the bandgap circuit, allowing the bandgap circuit to start up quickly. After the bandgap circuit completes startup, the internal bias voltage of the bandgap circuit may turn off the startup switch, the first transistor, and the second transistor. As a result, the start-up circuit does not consume current after the bandgap circuit completes startup.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
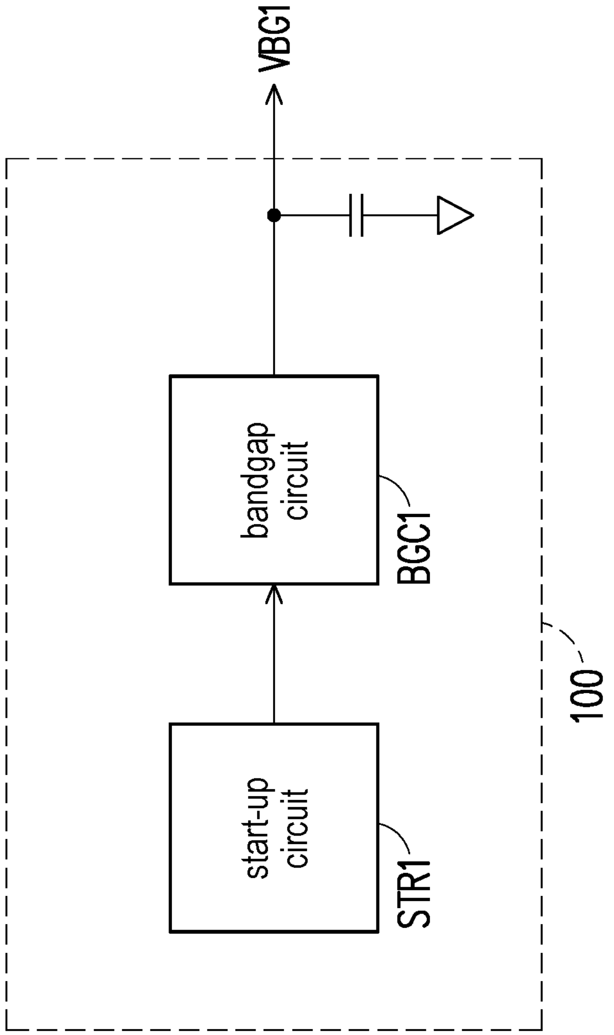
FIG. 1 is a schematic diagram of a circuit block of a bandgap device according to an embodiment of the disclosure.

Reference will now be made in detail to the exemplary embodiments of the disclosure, examples of which are illustrated in the accompanying drawings. Whenever possible, the same reference numerals are used in the drawings and descriptions to refer to the same or similar parts.

The word "coupling (or connecting)" used throughout the specification (including claims) of this case may refer to any direct or indirect means of connection. For example, if a first device is described as being coupled (or connected) to a second device, it should be interpreted as meaning that the first device can be directly connected to the second device, or that the first device can be indirectly connected to the second device through some other device or means of connection. The terms "first", "second" and the like mentioned throughout the specification (including claims) of this case are used to name element or to distinguish between different embodiments or scopes, and are not used to limit the upper or lower limit of the number of elements, and are not used to limit the order of elements. In addition, wherever possible, elements/components/steps with the same reference numerals are used in the drawings and embodiments to represent the same or similar parts. Elements/components/steps using the same reference numerals or using the same terms in different embodiments can refer to the relevant descriptions of each other.

FIG. 1 is a schematic diagram of a circuit block of a bandgap device 100 according to an embodiment of the disclosure. The bandgap device 100 shown in FIG. 1 includes a bandgap circuit BGC1 and a start-up circuit STR1. The bandgap circuit BGC1 is configured to provide a bandgap voltage VBG1. The bandgap circuit BGC1 is a circuit configured to generate a stable reference voltage. The bandgap circuit BGC1 is capable of outputting a highly stable, low-noise bandgap reference voltage VBG1 and is not affected by temperature changes. This embodiment does not limit the specific implementation of the bandgap circuit BGC1. For example, based on the actual design, the bandgap circuit BGC1 may include an ultra-low power self-bias bandgap circuit, a well-known bandgap circuit, or other bandgap circuits.

The start-up circuit STR1 is coupled to the bandgap circuit BGC1. In the case where a system has a low-power consumption function, when the system is in an idle period, multiple circuits (e.g., the bandgap circuit BGC1) in the system can enter a power-saving mode to reduce standby power consumption. When the idle period ends, all circuits in the system (e.g., the bandgap circuit BGC1) are expected to start up quickly to enter a normal operating state. The start-up circuit STR1 can start the bandgap circuit BGC1. At a power-on instant of the bandgap circuit, the start-up circuit STR1 can start the bandgap circuit BGC1 in real time. After the bandgap circuit completes startup, the start-up circuit STR1 can be disabled, so the start-up circuit does not consume current after the bandgap circuit completes startup. Specific implementation examples of the start-up circuit STR1 will be described in multiple embodiments in the following.

Figure 2:
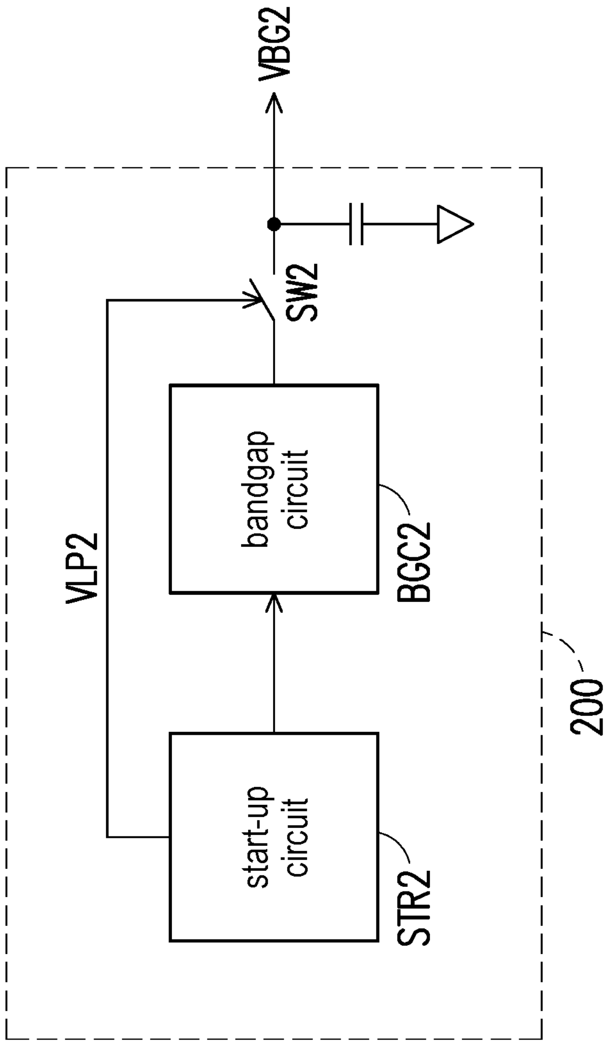
FIG. 2 is a schematic diagram of a circuit block of a bandgap device according to another embodiment of the disclosure.

FIG. 2 is a schematic diagram of a circuit block of a bandgap device 200 according to another embodiment of the disclosure. The bandgap device 200 shown in FIG. 2 includes a bandgap circuit BGC2, a start-up circuit STR2, and an output switch SW2. The bandgap device 200, the bandgap circuit BGC2, and the start-up circuit STR2 shown in FIG. 2 can be referred to the relevant descriptions of the bandgap device 100, the bandgap circuit BGC1, and the start-up circuit STR1 shown in FIG. 1, and therefore the details will not be repeated in the following. In the embodiment shown in FIG. 2, the start-up circuit STR2 can control the output switch SW2 through the control signal VLP2. At a startup instant time after a power-up instant time, the output switch STR2 is turned off to block the overshoot output of the bandgap circuit BGC2 during the startup process. At a startup completion time after the startup instant time, the output switch SW2 is turned on, so the gap circuit BGC2 can output the highly stable, low-noise bandgap reference voltage VBG2. Specific implementation examples of the start-up circuit STR2 will be described in multiple embodiments in the following.

Figure 3:
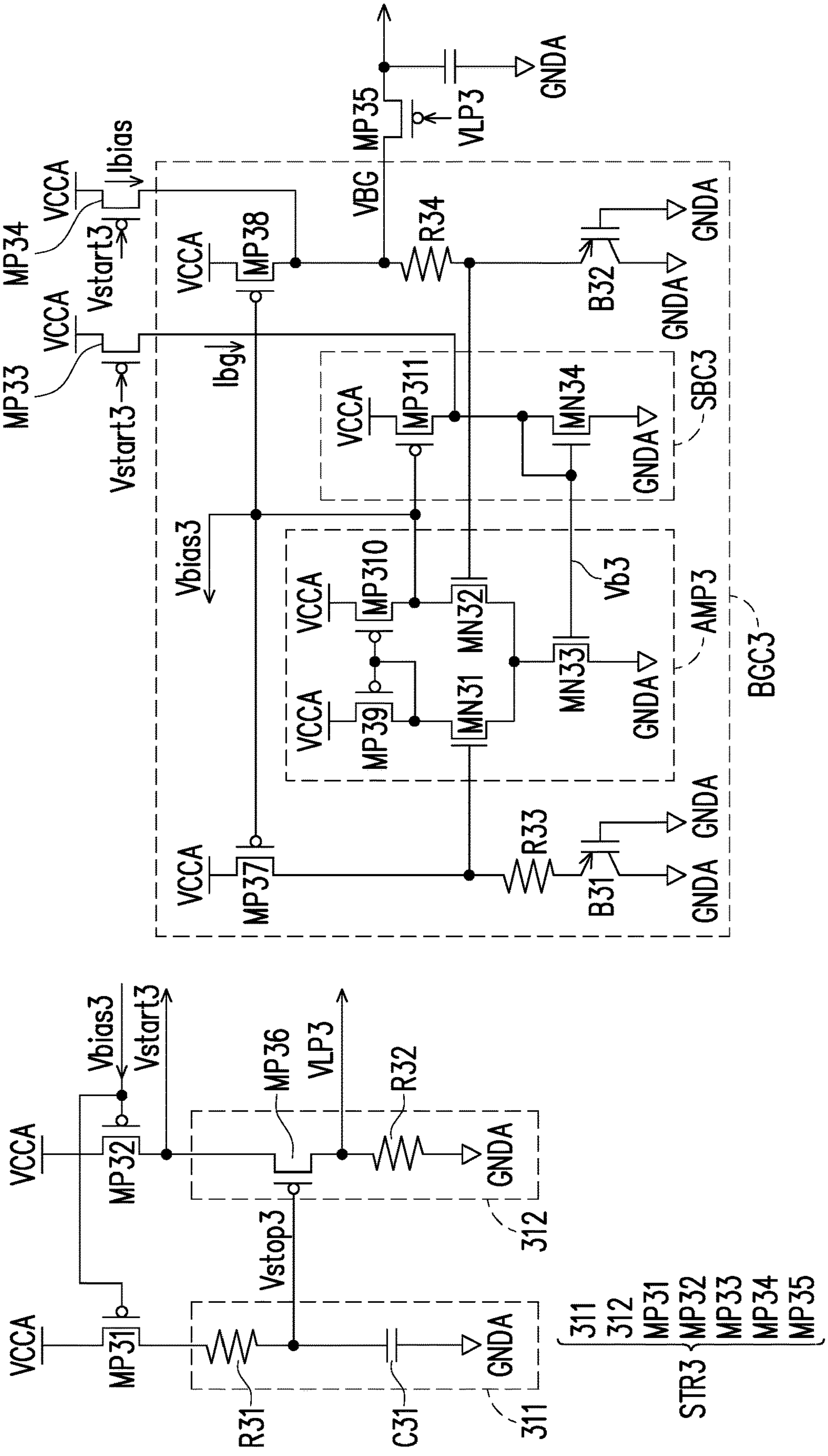
FIG. 3 is a schematic diagram of a circuit block of a bandgap circuit and a start-up circuit according to an embodiment of the disclosure.

FIG. 3 is a schematic diagram of a circuit block of a bandgap circuit BGC3 and a start-up circuit STR3 according to an embodiment of the disclosure. The bandgap circuit BGC3 and the start-up circuit STR3 shown in FIG. 3 can be used as one of many implementation examples of the bandgap circuit BGC2 and the start-up circuit STR2 shown in FIG. 2, or as one of many implementation examples of the bandgap circuit BGC1 and the start-up circuit STR1 shown in FIG. 1. The bandgap circuit BGC3 and the start-up circuit STR3 shown in FIG. 3 can be referred to and by analogy with the relevant descriptions of the bandgap circuit BGC2 and the start-up circuit STR2 shown in FIG. 2 (or the bandgap circuit BGC1 and the start-up circuit STR1 shown in FIG. 1).

In the embodiment shown in FIG. 3, the start-up circuit STR3 includes a delay circuit 311, a switch circuit 312, a transistor MP31, a transistor MP32, a startup switch MP33, a startup switch MP34, and an output switch MP35. The output switch MP35 shown in FIG. 3 can be used as one of many implementation examples of the output switch SW2 shown in FIG. 2. The transistor MP31, the transistor MP32, the startup switch MP33, the startup switch MP34, or the output switch MP35 shown in FIG. 3 may include a metal-oxide-semiconductor (MOS) transistor or other types of transistors. For example, any one of the transistor MP31, the transistor MP32, the startup switch MP33, the startup switch MP34, and the output switch MP35 may be a p-type MOS (PMOS) transistor.

A first terminal (e.g., the source) of the transistor MP31 is coupled to a first voltage (e.g., a power voltage VCCA). The actual level of the power voltage VCCA can be determined according to the actual design. A control terminal (e.g., the gate) of the transistor MP31 is controlled by a first internal bias voltage (e.g., a bias voltage Vbias3) of the bandgap circuit BGC3. A first terminal of the delay circuit 311 is coupled to a second terminal (e.g., the drain) of the transistor MP31. A second terminal of the delay circuit 311 is coupled to a second voltage (e.g., a reference voltage GNDA). The actual level of the reference voltage GNDA can be determined according to the actual design, such as 0V or other voltage levels. In the embodiment shown in FIG. 3, the delay circuit 311 includes a current limiting resistor R31 and a capacitor C31. A first terminal of the current limiting resistor R31 is coupled to the second terminal of the transistor MP31. A second terminal of the current limiting resistor R31 is coupled to a control terminal of the switch circuit 312 to provide a startup-stop signal Vstop3. A first terminal of the capacitor C31 is coupled to the second terminal of the current limiting resistor R31. A second terminal of the capacitor C31 is coupled to the second voltage (e.g., the reference voltage GNDA).

A first terminal (e.g., the source) of the transistor MP32 is coupled to a third voltage (e.g., the power voltage VCCA). A control terminal (e.g., the gate) of the transistor MP32 is controlled by a second internal bias voltage (e.g., the bias voltage Vbias3) of the bandgap circuit BGC3. A first terminal of the switch circuit 312 is coupled to a second terminal (e.g., the drain) of the transistor MP32. A second terminal of the switch circuit 312 is coupled to a fourth voltage (e.g., the reference voltage GNDA). The control terminal of the switch circuit 312 is controlled by the startup-stop signal Vstop3 of an output terminal of the delay circuit 311. In the embodiment shown in FIG. 3, the switch circuit 312 includes a switch transistor MP36 and a resistor R32. The switch transistor MP36 shown in FIG. 3 may include a MOS transistor or other types of transistors. For example, the switch transistor MP36 may be a PMOS transistor. A first terminal (e.g., the source) of the switch transistor MP36 is coupled to the second terminal of the transistor MP32. A control terminal (e.g., the gate) of the switch transistor MP36 is controlled by the startup-stop signal Vstop3 of the output terminal of the delay circuit 311. A first terminal of the resistor R32 is coupled to a second terminal (e.g., the drain) of the switch transistor MP36. A second terminal of resistor R32 is coupled to the fourth voltage (e.g., the reference voltage GNDA).

A first terminal of the startup switch MP33 is coupled to the power voltage VCCA. A second terminal of the startup switch MP33 is coupled to an internal startup node of the bandgap circuit BGC3 to provide a startup bias current Ibg during start-up. A control terminal of the startup switch MP33 is coupled to the second terminal of the transistor MP32 and the first terminal of the switch circuit 312 to receive a startup signal Vstart3. A first terminal of the startup switch MP34 is coupled to the power voltage VCCA. A second terminal of the startup switch MP34 is coupled to another internal startup node of the bandgap circuit BGC3 to provide the startup bias current Ibias during start-up. A control terminal of the startup switch MP34 is coupled to the second terminal of the transistor MP32 and the first terminal of the switch circuit 312 to receive the startup signal Vstart3. A first terminal of the output switch MP35 is coupled to an output terminal of the bandgap circuit BGC3. A control terminal of the output switch MP35 is controlled by an output voltage VLP3 of the switch circuit 312.

In the embodiment shown in FIG. 3, the bandgap circuit BGC3 includes an amplifier circuit AMP3, a self-bias circuit SBC3, a transistor MP37, a resistor R33, a transistor B31, a transistor MP38, a resistor R34, and a transistor B32. A first terminal (e.g., the source) of the transistor MP37 is coupled to a sixth voltage (e.g., the power voltage VCCA). A second terminal (e.g., the drain) of the transistor MP37 is coupled to a first input terminal of the amplifier circuit AMP3. A control terminal (e.g., the gate) of the transistor MP37 is coupled to an output terminal of the amplifier circuit AMP3. A first terminal of the resistor R33 is coupled to the second terminal of the transistor MP37. A first terminal (e.g., the emitter) of the transistor B31 is coupled to a second terminal of the resistor R33. A second terminal (e.g., the collector) of the transistor B31 is coupled to a seventh voltage (e.g., the reference voltage GNDA). A control terminal (e.g., the base) of transistor B31 is coupled to an eighth voltage (e.g., the reference voltage GNDA).

The internal bias voltage used to control the transistor MP31 and the transistor MP32 is an output voltage (the bias voltage Vbias3 shown in FIG. 3) of the output terminal of the amplifier circuit AMP3. In the embodiment shown in FIG. 3, the amplifier circuit AMP3 includes a transistor MP39, a transistor MP310, a transistor MN31, a transistor MN32, and a transistor MN33. The transistors MP39, MP310, MN31, MN32, or MN33 shown in FIG. 3 may include MOS transistors or other types of transistors. For example, any one of the transistors MP39 and MP310 may be a PMOS transistor, and any one of the transistors MN31, MN32, and MN33 may be an n-type MOS (NMOS) transistor. A first terminal (e.g., the source) of the transistor MP39 is coupled to a twelfth voltage (e.g., the power voltage VCCA). A control terminal (e.g., the gate) of the transistor MP39 is coupled to a second terminal (e.g., the drain) of the transistor MP39. A first terminal (e.g., the drain) of the transistor MN31 is coupled to the second terminal of the transistor MP39. A control terminal (e.g., the gate) of the transistor MN31 is coupled to the first input terminal of the amplifier circuit AMP3. A first terminal (e.g., the source) of the transistor MP310 is coupled to a thirteenth voltage (e.g., the power voltage VCCA). A second terminal (e.g., the drain) of the transistor MP310 is coupled to the output terminal of the amplifier circuit AMP3. A control terminal (e.g., the gate) of the transistor MP310 is coupled to the second terminal of the transistor MP39. A first terminal (e.g., the drain) of the transistor MN32 is coupled to the second terminal of the transistor MP310. A control terminal (e.g., the gate) of the transistor MN32 is coupled to a second input terminal of the amplifier circuit AMP3. A first terminal (e.g., the drain) of the transistor MN33 is coupled to a second terminal (e.g., the source) of the transistor MN31 and a second terminal (e.g., the source) of the transistor MN32. A second terminal (e.g., the source) of the transistor MN33 is coupled to a fourteenth voltage (e.g., the reference voltage GNDA). A control terminal (e.g., the gate) of the transistor MN33 is controlled by the internal bias voltage (the bias voltage Vb3 shown in FIG. 3).

A first terminal (e.g., the source) of the transistor MP38 is coupled to a ninth voltage (e.g., the power voltage VCCA). A second terminal (e.g., the drain) of the transistor MP38 is coupled to the output terminal of the bandgap circuit BGC3 to provide a bandgap voltage VBG. A control terminal (e.g., the gate) of the transistor MP38 is coupled to the output terminal of the amplifier circuit AMP3. A first terminal of the resistor R34 is coupled to the second terminal of the transistor MP38. A second terminal of the resistor R34 is coupled to the second input terminal of the amplifier circuit AMP3. The internal startup node to which the second terminal of the startup switch MP34 is coupled is coupled to the first terminal of the resistor R34 and the second terminal of the transistor MP38. A first terminal (e.g., the emitter) of the transistor B32 is coupled to the second terminal of the resistor R34. A second terminal (e.g., the collector) of the transistor B32 is coupled to a tenth voltage (e.g., the reference voltage GNDA). A control terminal (e.g., the base) of the transistor B32 is coupled to an eleventh voltage (e.g., the reference voltage GNDA). An input terminal of the self-bias circuit SBC3 is coupled to the output terminal of the amplifier circuit AMP3. An output terminal of the self-bias circuit SBC3 is coupled to a bias terminal of the amplifier circuit AMP3 to provide the internal bias voltage Vb3.

In the embodiment shown in FIG. 3, the self-bias circuit SBC3 includes a transistor MP311 and a transistor MN34. The transistor MP311 or MN34 shown in FIG. 3 may include a MOS transistor or other types of transistors. For example, the transistor MP311 may be a PMOS transistor, and the transistor MN34 may be an NMOS transistor. A first terminal (e.g., the source) of the transistor MP311 is coupled to a twelfth voltage (e.g., the power voltage VCCA). A second terminal (e.g., the drain) of the transistor MP311 is coupled to the output terminal of the self-bias circuit SBC3. A control terminal (e.g., the gate) of the transistor MP311 is coupled to the input terminal of the self-bias circuit SBC3. A first terminal (e.g., the drain) of the transistor MN34 is coupled to the second terminal of the transistor MP311. A second terminal (e.g., the source) of the transistor MN34 is coupled to a thirteenth voltage (e.g., the reference voltage GNDA). A control terminal (e.g., the gate) of the transistor MN34 is coupled to the first terminal of the transistor MN34. The internal startup node to which the second terminal of the startup switch MP33 is coupled is coupled to the second terminal of transistor MP311 and the first terminal of transistor MN34.

At the power-up instant time of the bandgap circuit BGC3 (the instant when the power voltage VCCA changes from low level to high level), the transistors MP31 and MP32 are turned off, and the startup-stop signal Vstop3 starts to be low level. Thus, the switch circuit 312 is turned on so that the startup signal Vstart3 is low level, and then the startup switch MP33 and the startup switch MP34 are turned on to provide a startup bias (the startup bias current Ibg and Ibias) to the internal startup node of the bandgap circuit BGC3.

At the startup instant time after the power-up instant time, the switch transistor MP36 (the switch circuit 312), the transistor MP31, and the transistor MP32 are turned on. As the self-bias circuit SBC3 is activated, the level of the bias voltage Vbias3 decreases, causing the transistors MP31 and MP32 to gradually turn on. The turning on of the transistor MP32 causes the startup signal Vstart3 and the output voltage VLP3 of the switch circuit 312 to rise, causing the startup switch MP33, the startup switch MP34, and the output switch MP35 to be turned off. The turn-off startup switches MP33 and MP34 may stop the supply of the startup bias (the startup bias current Ibg and Ibias) to the internal startup node of the bandgap circuit BGC3, thus avoiding affecting the normal operation of the bandgap circuit BGC3. The turn-off output switch MP35 may block the overshoot output of the bandgap circuit BGC3 during the startup process.

The transistor MP31 charges the capacitor C31 through the current limiting resistor R31, so that the level of the startup-stop signal Vstop3 gradually increases. The level of the startup-stop signal Vstop3 finally rises to a level close to the level of the power voltage VCCA, causing the switch transistor MP36 to turn off. Because the switch transistor MP36 is turned off, the transistor MP32 may pull up the level of the startup signal Vstart3 to a level close to the level of the power voltage VCCA, and the resistor R32 may pull down the output voltage VLP3 of the switch circuit 312 to a level close to the level of the reference voltage GNDA. At the startup completion time after the startup instant time, the switch circuit 312, the startup switch MP33, and the startup switch MP34 are turned off. Because the bandgap circuit BGC3 completes startup, the transistors MP31 and MP32 are turned off. The low-level output voltage VLP3 may turn on the output switch MP35 to avoid affecting the normal output of the bandgap circuit BGC3.

To sum up, at the power-on instant of the bandgap circuit BGC3, the transistor MP32 and the switch circuit 312 may turn on the startup switches MP33 and MP34 to provide the startup bias (the startup bias current Ibg and Ibias) to the internal startup node of the bandgap circuit BGC3, allowing the bandgap circuit BGC3 to start up quickly. After the bandgap circuit BGC3 completes startup, the internal bias voltage Vbias3 of the bandgap circuit BGC3 may turn off the transistors MP31 and MP32, and the startup switches MP33 and MP34 may also remain turned off. As a result, the start-up circuit STR3 does not consume current after the bandgap circuit BGC3 completes startup.

Figure 4:
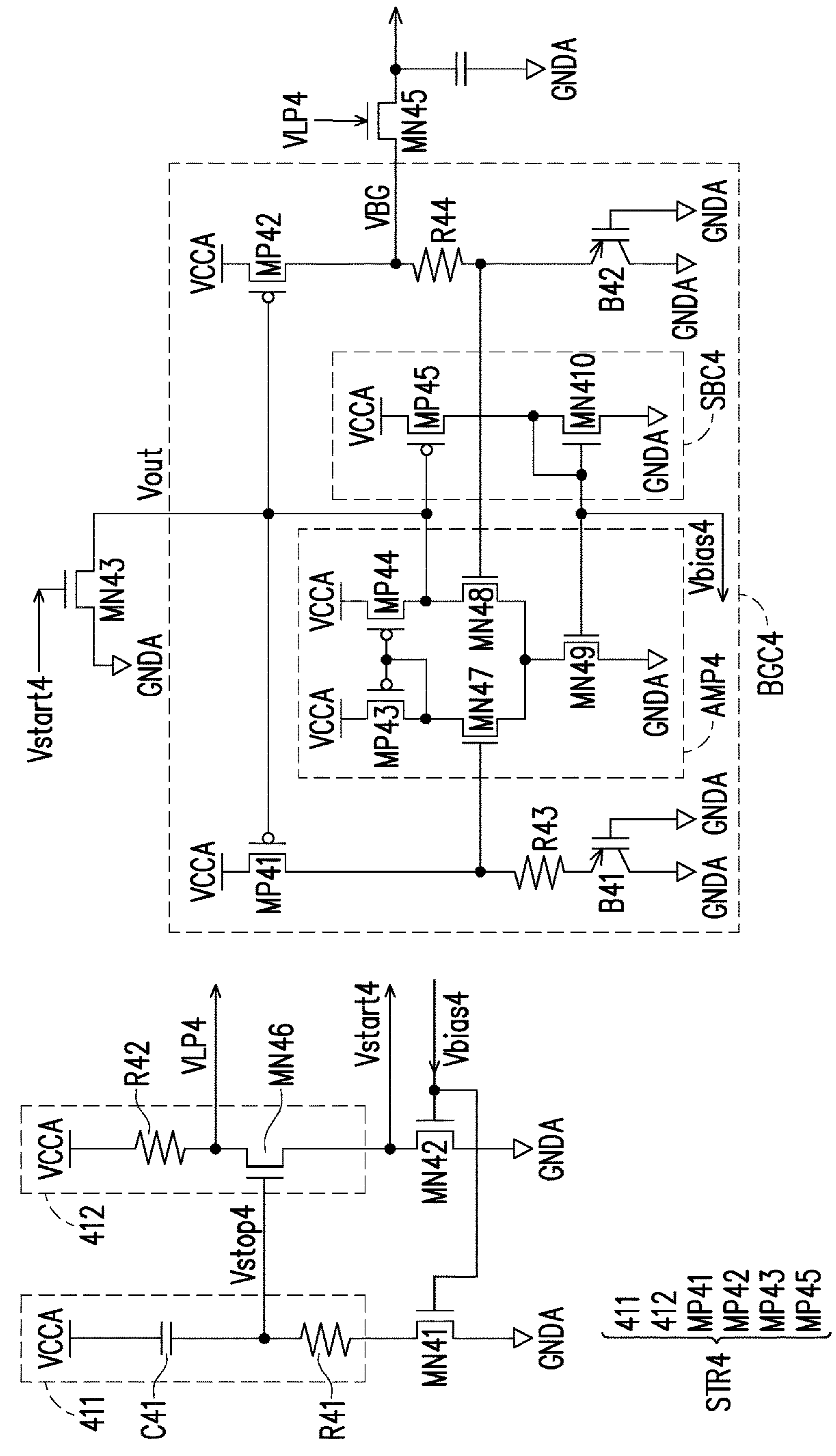
FIG. 4 is a schematic diagram of a circuit block of a bandgap circuit and a start-up circuit according to another embodiment of the disclosure.

FIG. 4 is a schematic diagram of a circuit block of a bandgap circuit BGC4 and a start-up circuit STR4 according to another embodiment of the disclosure. The bandgap circuit BGC4 and the start-up circuit STR4 shown in FIG. 4 can be used as one of many implementation examples of the bandgap circuit BGC2 and the start-up circuit STR2 shown in FIG. 2, or as one of many implementation examples of the bandgap circuit BGC1 and the start-up circuit STR1 shown in FIG. 1. The bandgap circuit BGC4 and the start-up circuit STR4 shown in FIG. 4 can be referred to and by analogy with the relevant descriptions of the bandgap circuit BGC2 and the start-up circuit STR2 shown in FIG. 2 (or the bandgap circuit BGC1 and the start-up circuit STR1 shown in FIG. 1).

In the embodiment shown in FIG. 4, the start-up circuit STR4 includes a delay circuit 411, a switch circuit 412, a transistor MN41, a transistor MN42, a startup switch MN43, and an output switch MN45. The output switch MN45 shown in FIG. 4 can be used as one of many implementation examples of the output switch SW2 shown in FIG. 2. The transistor MN41, the transistor MN42, the startup switch MN43, or the output switch MN45 shown in FIG. 4 may include a metal-oxide-semiconductor (MOS) transistor or other types of transistors. For example, any one of the transistor MN41, the transistor MN42, the startup switch MN43, and the output switch MN45 may be NMOS transistor.

A first terminal (e.g., the source) of the transistor MN41 is coupled to a first voltage (e.g., a reference voltage GNDA). A control terminal (e.g., the gate) of the transistor MN41 is controlled by a first internal bias voltage (e.g., a bias voltage Vbias4) of the bandgap circuit BGC4. A first terminal of the delay circuit 411 is coupled to a second terminal (e.g., the drain) of the transistor MN41. A second terminal of the delay circuit 411 is coupled to a second voltage (e.g., a power voltage VCCA). In the embodiment shown in FIG. 4, the delay circuit 411 includes a current limiting resistor R41 and a capacitor C41. A first terminal of the current limiting resistor R41 is coupled to the second terminal of the transistor MN41. A second terminal of the current limiting resistor R41 is coupled to a control terminal of the switch circuit 412 to provide a startup-stop signal Vstop4. A first terminal of the capacitor C41 is coupled to the second terminal of the current limiting resistor R41. A second terminal of the capacitor C41 is coupled to the second voltage (e.g., the power voltage VCCA).

A first terminal (e.g., the source) of the transistor MN42 is coupled to a third voltage (e.g., the reference voltage GNDA). A control terminal (e.g., the gate) of the transistor MN42 is controlled by a second internal bias voltage (e.g., the bias voltage Vbias4) of the bandgap circuit BGC4. A first terminal of the switch circuit 412 is coupled to a second terminal (e.g., the drain) of the transistor MN42. A second terminal of the switch circuit 412 is coupled to a fourth voltage (e.g., the power voltage VCCA). The control terminal of the switch circuit 412 is controlled by the startup-stop signal Vstop4 of an output terminal of the delay circuit 411. In the embodiment shown in FIG. 4, the switch circuit 412 includes a switch transistor MN46 and a resistor R42. The switch transistor MN46 shown in FIG. 4 may include a MOS transistor or other types of transistors. For example, the switch transistor MN46 may be a NMOS transistor. A first terminal (e.g., the source) of the switch transistor MN46 is coupled to the second terminal of the transistor MN42. A control terminal (e.g., the gate) of the switch transistor MN46 is controlled by the startup-stop signal Vstop4 of the output terminal of the delay circuit 411. A first terminal of the resistor R42 is coupled to a second terminal (e.g., the drain) of the switch transistor MN46. A second terminal of resistor R42 is coupled to the fourth voltage (e.g., the power voltage VCCA).

A first terminal of the startup switch MN43 is coupled to the reference voltage GNDA. A second terminal of the startup switch MN43 is coupled to an internal startup node of the bandgap circuit BGC4 to provide a startup bias voltage Vout during start-up. A control terminal of the startup switch MN43 is coupled to the second terminal of the transistor MN42 and the first terminal of the switch circuit 412 to receive a startup signal Vstart4. A first terminal of the output switch MN45 is coupled to an output terminal of the bandgap circuit BGC4. A control terminal of the output switch MN45 is controlled by an output voltage VLP4 of the switch circuit 412.

In the embodiment shown in FIG. 4, the bandgap circuit BGC4 includes an amplifier circuit AMP4, a self-bias circuit SBC4, a transistor MP41, a resistor R43, a transistor B41, a transistor MP42, a resistor R44, and a transistor B42. A first terminal (e.g., the source) of the transistor MP41 is coupled to a sixth voltage (e.g., the power voltage VCCA). A second terminal (e.g., the drain) of the transistor MP41 is coupled to a first input terminal of the amplifier circuit AMP4. A control terminal (e.g., the gate) of the transistor MP41 is coupled to an output terminal of the amplifier circuit AMP4. The internal startup node to which the second terminal of the startup switch MN43 is coupled is coupled to the control terminal of the transistor MP41. A first terminal of the resistor R43 is coupled to the second terminal of the transistor MP41. A first terminal (e.g., the emitter) of the transistor B41 is coupled to a second terminal of the resistor R43. A second terminal (e.g., the collector) of the transistor B41 is coupled to a seventh voltage (e.g., the reference voltage GNDA). A control terminal (e.g., the base) of transistor B41 is coupled to an eighth voltage (e.g., the reference voltage GNDA).

In the embodiment shown in FIG. 4, the amplifier circuit AMP4 includes a transistor MP43, a transistor MP44, a transistor MN47, a transistor MN48, and a transistor MN49. The transistors MP43, MP44, MN47, MN48, or MN49 shown in FIG. 4 may include MOS transistors or other types of transistors. For example, any one of the transistors MP43 and MP44 may be a PMOS transistor, and any one of the transistors MN47, MN48, and MN49 may be an NMOS transistor. A first terminal (e.g., the source) of the transistor MP43 is coupled to a twelfth voltage (e.g., the power voltage VCCA). A control terminal (e.g., the gate) of the transistor MP43 is coupled to a second terminal (e.g., the drain) of the transistor MP43. A first terminal (e.g., the drain) of the transistor MN47 is coupled to the second terminal of the transistor MP43. A control terminal (e.g., the gate) of the transistor MN47 is coupled to the first input terminal of the amplifier circuit AMP4. A first terminal (e.g., the source) of the transistor MP44 is coupled to a thirteenth voltage (e.g., the power voltage VCCA). A second terminal (e.g., the drain) of the transistor MP44 is coupled to the output terminal of the amplifier circuit AMP4. A control terminal (e.g., the gate) of the transistor MP44 is coupled to the second terminal of the transistor MP43. A first terminal (e.g., the drain) of the transistor MN48 is coupled to the second terminal of the transistor MP44. A control terminal (e.g., the gate) of the transistor MN48 is coupled to a second input terminal of the amplifier circuit AMP4. A first terminal (e.g., the drain) of the transistor MN49 is coupled to a second terminal (e.g., the source) of the transistor MN47 and a second terminal (e.g., the source) of the transistor MN48. A second terminal (e.g., the source) of the transistor MN49 is coupled to a fourteenth voltage (e.g., the reference voltage GNDA). A control terminal (e.g., the gate) of the transistor MN49 is controlled by the internal bias voltage (the bias voltage Vbias 4 shown in FIG. 4).

A first terminal (e.g., the source) of the transistor MP42 is coupled to a ninth voltage (e.g., the power voltage VCCA). A second terminal (e.g., the drain) of the transistor MP42 is coupled to the output terminal of the bandgap circuit BGC4 to provide a bandgap voltage VBG. A control terminal (e.g., the gate) of the transistor MP42 is coupled to the output terminal of the amplifier circuit AMP4. The internal startup node to which the second terminal of the startup switch MN43 is coupled is coupled to the control terminal of the transistor MP42. A first terminal of the resistor R44 is coupled to the second terminal of the transistor MP42. A second terminal of the resistor R44 is coupled to the second input terminal of the amplifier circuit AMP4. A first terminal (e.g., the emitter) of the transistor B42 is coupled to the second terminal of the resistor R44. A second terminal (e.g., the collector) of the transistor B42 is coupled to a tenth voltage (e.g., the reference voltage GNDA). A control terminal (e.g., the base) of the transistor B42 is coupled to an eleventh voltage (e.g., the reference voltage GNDA). An input terminal of the self-bias circuit SBC4 is coupled to the output terminal of the amplifier circuit AMP4. The internal startup node to which the second terminal of the startup switch MN43 is coupled is coupled to the input terminal of the self-bias circuit SBC4. An output terminal of the self-bias circuit SBC4 is coupled to a bias terminal of the amplifier circuit AMP4 to provide the internal bias voltage Vbias4. The internal bias voltage used to control the transistor MN41 and the transistor MN42 is an internal bias voltage Vbias4 (the bias voltage Vbias4 shown in FIG. 4) of the output terminal of the self-bias circuit SBC4

In the embodiment shown in FIG. 4, the self-bias circuit SBC4 includes a transistor MP45 and a transistor MN410. The transistor MP45 or MN410 shown in FIG. 4 may include a MOS transistor or other types of transistors. For example, the transistor MP45 may be a PMOS transistor, and the transistor MN410 may be an NMOS transistor. A first terminal (e.g., the source) of the transistor MP45 is coupled to a twelfth voltage (e.g., the power voltage VCCA). A second terminal (e.g., the drain) of the transistor MP45 is coupled to the output terminal of the self-bias circuit SBC4. A control terminal (e.g., the gate) of the transistor MP45 is coupled to the input terminal of the self-bias circuit SBC4. A first terminal (e.g., the drain) of the transistor MN410 is coupled to the second terminal of the transistor MP45. A second terminal (e.g., the source) of the transistor MN410 is coupled to a thirteenth voltage (e.g., the reference voltage GNDA). A control terminal (e.g., the gate) of the transistor MN410 is coupled to the first terminal of the transistor MN410.

At the power-up instant time of the bandgap circuit BGC4 (the instant when the power voltage VCCA changes from low level to high level), the transistors MN41 and MN42 are turned off, and the startup-stop signal Vstop4 starts to be low level. Thus, the switch circuit 412 is turned on so that the startup signal Vstart4 is low level, and then the startup switch MN43 is turned on to provide a startup bias (the startup bias voltage Vout) to the internal startup node of the bandgap circuit BGC4. Therefore, the bandgap circuit BGC4 and the self-bias circuit SBC4 can be activated. At the startup instant time after the power-up instant time, the switch transistor MN46 (the switch circuit 412), the transistor MN41, and the transistor MN42 are turned on. As the self-bias circuit SBC4 is activated, the level of the bias voltage Vbias4 decreases, causing the transistors MN41 and MN42 to gradually turn on. The turning on of the transistor MN42 causes the startup signal Vstart4 and the output voltage VLP4 of the switch circuit 412 to drop, causing the startup switch MN43 and the output switch MN45 to be turned off. The turn-off startup switch MN43 may stop the supply of the startup bias (the startup bias voltage Vout) to the internal startup node of the bandgap circuit BGC4, thus avoiding affecting the normal operation of the bandgap circuit BGC4. The turn-off output switch MN45 may block the overshoot output of the bandgap circuit BGC4 during the startup process.

The transistor MN41 discharges the capacitor C41 through the current limiting resistor R41, so that the level of the startup-stop signal Vstop4 gradually decreases. The level of the startup-stop signal Vstop4 finally decreases to a level close to the level of the reference voltage GNDA, causing the switch transistor MN46 to turn off. Because the switch transistor MN46 is turned off, the transistor MN42 may pull down the level of the startup signal Vstart4 to a level close to the level of the reference voltage GNDA, and the resistor R42 may pull up the output voltage VLP4 of the switch circuit 412 to a level close to the level of the power voltage VCCA. At the startup completion time after the startup instant time, the switch circuit 412 and the startup switch MN43 are turned off. Because the bandgap circuit BGC4 completes startup, the transistors MN41 and MN42 are turned off. The low-level output voltage VLP4 may turn on the output switch MN45 to avoid affecting the normal output of the bandgap circuit BGC4.

To sum up, at the power-on instant of the bandgap circuit BGC4, the transistor MN42 and the switch circuit 412 may turn on the startup switch MN43 to provide the startup bias (the startup bias voltage Vout) to the internal startup node of the bandgap circuit BGC4, allowing the bandgap circuit BGC4 to start up quickly. After the bandgap circuit BGC4 completes startup, the internal bias voltage Vbias4 of the bandgap circuit BGC4 may turn off the transistors MN41 and MN42, and the startup switch MN43 may also remain turned off. As a result, the start-up circuit STR4 does not consume current after the bandgap circuit BGC4 completes startup.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A start-up circuit, configured to start a bandgap circuit, wherein the start-up circuit comprises:

a first transistor, wherein a first terminal of the first transistor is coupled to a first voltage, and a control terminal of the first transistor is controlled by a first internal bias voltage of the bandgap circuit;

a delay circuit, wherein a first terminal of the delay circuit is coupled to a second terminal of the first transistor, and a second terminal of the delay circuit is coupled to a second voltage;

a second transistor, wherein a first terminal of the second transistor is coupled to a third voltage, and a control terminal of the second transistor is controlled by a second internal bias voltage of the bandgap circuit;

a switch circuit, wherein a first terminal of the switch circuit is coupled to a second terminal of the second transistor, a second terminal of the switch circuit is coupled to a fourth voltage, and a control terminal of the switch circuit is controlled by an output terminal of the delay circuit; and a first startup switch, wherein a first terminal of the first startup switch is coupled to a fifth voltage, a second terminal of the first startup switch is coupled to a first internal startup node of the bandgap circuit, and a control terminal of the first startup switch is coupled to the second terminal of the second transistor and the first terminal of the switch circuit.

2. The start-up circuit according to claim 1, wherein at a power-up instant time of the bandgap circuit, the first transistor and the second transistor are turned off, and the switch circuit and the first startup switch are turned on to provide a startup bias to the first internal startup node of the bandgap circuit;

at a startup instant time after the power-up instant time, the first transistor, the second transistor, and the switch circuit are turned on, and the first startup switch is turned off to stop providing the startup bias to the first internal startup node of the bandgap circuit; and at a startup completion time after the startup instant time, the switch circuit and the first startup switch are turned off and the bandgap circuit completes startup, causing the first transistor and the second transistor to be turned off.

3. The start-up circuit according to claim 1, wherein the start-up circuit further comprises:

an output switch, wherein a first terminal of the output switch is coupled to an output terminal of the bandgap circuit, and a control terminal of the output switch is controlled by an output voltage of the switch circuit.

4. The start-up circuit according to claim 3, wherein at a startup instant time after a power-up instant time, the output switch is turned off to block overshoot output of the bandgap circuit; and at a startup completion time after the startup instant time, the output switch is turned on.

5. The start-up circuit according to claim 1, wherein the start-up circuit further comprises:

a second startup switch, wherein a first terminal of the second startup switch is coupled to a sixth voltage, a second terminal of the second startup switch is coupled to a second internal startup node of the bandgap circuit, and a control terminal of the second startup switch is coupled to the second terminal of the second transistor and the first terminal of the switch circuit.

6. The start-up circuit according to claim 5, wherein at a power-up instant time of the bandgap circuit, the second startup switch is turned on to provide a startup bias to the second internal startup node of the bandgap circuit;

at a startup instant time after the power-up instant time, the second startup switch is turned off to stop providing the startup bias to the second internal startup node of the bandgap circuit; and at a startup completion time after the startup instant time, the second startup switch is turned off.

7. The start-up circuit according to claim 1, wherein the delay circuit comprises:

a current limiting resistor, wherein a first terminal of the current limiting resistor is coupled to the second terminal of the first transistor, and a second terminal of the current limiting resistor is coupled to the control terminal of the switch circuit; and a capacitor, wherein a first terminal of the capacitor is coupled to the second terminal of the current limiting resistor, and a second terminal of the capacitor is coupled to the second voltage.

8. The start-up circuit according to claim 1, wherein the switch circuit comprises:

a switch transistor, wherein a first terminal of the switch transistor is coupled to the second terminal of the second transistor, and a control terminal of the switch transistor is controlled by the output terminal of the delay circuit; and a resistor, wherein a first terminal of the resistor is coupled to a second terminal of the switch transistor, and a second terminal of the resistor is coupled to the fourth voltage.

9. A bandgap device, wherein the bandgap device comprises:

a bandgap circuit, configured to provide a bandgap voltage; and a start-up circuit, coupled to the bandgap circuit, configured to start the bandgap circuit, wherein the start-up circuit comprises:

a first transistor, wherein a first terminal of the first transistor is coupled to a first voltage, and a control terminal of the first transistor is controlled by a first internal bias voltage of the bandgap circuit;

a delay circuit, wherein a first terminal of the delay circuit is coupled to a second terminal of the first transistor, and a second terminal of the delay circuit is coupled to a second voltage;

a second transistor, wherein a first terminal of the second transistor is coupled to a third voltage, and a control terminal of the second transistor is controlled by a second internal bias voltage of the bandgap circuit;

a switch circuit, wherein a first terminal of the switch circuit is coupled to a second terminal of the second transistor, a second terminal of the switch circuit is coupled to a fourth voltage, and a control terminal of the switch circuit is controlled by an output terminal of the delay circuit; and a first startup switch, wherein a first terminal of the first startup switch is coupled to a fifth voltage, a second terminal of the first startup switch is coupled to a first internal startup node of the bandgap circuit, and a control terminal of the first startup switch is coupled to the second terminal of the second transistor and the first terminal of the switch circuit.

10. The bandgap device according to claim 9, wherein, at a power-up instant time of the bandgap circuit, the first transistor and the second transistor are turned off, and the switch circuit and the first startup switch are turned on to provide a startup bias to the first internal startup node of the bandgap circuit;

at a startup instant time after the power-up instant time, the first transistor, the second transistor, and the switch circuit are turned on, and the first startup switch is turned off to stop providing the startup bias to the first internal startup node of the bandgap circuit; and at a startup completion time after the startup instant time, the switch circuit and the first startup switch are turned off and the bandgap circuit completes startup, causing the first transistor and the second transistor to be turned off.

11. The bandgap device according to claim 9, wherein the start-up circuit further comprises:

an output switch, wherein a first terminal of the output switch is coupled to an output terminal of the bandgap circuit, and a control terminal of the output switch is controlled by an output voltage of the switch circuit.

12. The bandgap device according to claim 11, wherein at a startup instant time after a power-up instant time, the output switch is turned off to block overshoot output of the bandgap circuit; and at a startup completion time after the startup instant time, the output switch is turned on.

13. The bandgap device according to claim 9, wherein the start-up circuit further comprises:

a second startup switch, wherein a first terminal of the second startup switch is coupled to a sixth voltage, a second terminal of the second startup switch is coupled to a second internal startup node of the bandgap circuit, and a control terminal of the second startup switch is coupled to the second terminal of the second transistor and the first terminal of the switch circuit.

14. The bandgap device according to claim 13, wherein at a power-up instant time of the bandgap circuit, the second startup switch is turned on to provide a startup bias to the second internal startup node of the bandgap circuit;

at a startup instant time after the power-up instant time, the second startup switch is turned off to stop providing the startup bias to the second internal startup node of the bandgap circuit; and at a startup completion time after the startup instant time, the second startup switch is turned off.

15. The bandgap device according to claim 9, wherein the delay circuit comprises:

a current limiting resistor, wherein a first terminal of the current limiting resistor is coupled to the second terminal of the first transistor, and a second terminal of the current limiting resistor is coupled to the control terminal of the switch circuit; and a capacitor, wherein a first terminal of the capacitor is coupled to the second terminal of the current limiting resistor, and a second terminal of the capacitor is coupled to the second voltage.

16. The bandgap device according to claim 9, wherein the switch circuit comprises:

a switch transistor, wherein a first terminal of the switch transistor is coupled to the second terminal of the second transistor, and a control terminal of the switch transistor is controlled by the output terminal of the delay circuit; and a resistor, wherein a first terminal of the resistor is coupled to a second terminal of the switch transistor, and a second terminal of the resistor is coupled to the fourth voltage.

17. The bandgap device according to claim 9, wherein the bandgap circuit comprises:

an amplifier circuit;

a third transistor, wherein a first terminal of the third transistor is coupled to a sixth voltage, a second terminal of the third transistor is coupled to a first input terminal of the amplifier circuit, and a control terminal of the third transistor is coupled to an output terminal of the amplifier circuit;

a first resistor, wherein a first terminal of the first resistor is coupled to the second terminal of the third transistor;

a fourth transistor, wherein a first terminal of the fourth transistor is coupled to a second terminal of the first resistor, a second terminal of the fourth transistor is coupled to a seventh voltage, and a control terminal of the fourth transistor is coupled to an eighth voltage;

a fifth transistor, wherein a first terminal of the fifth transistor is coupled to a ninth voltage, a second terminal of the fifth transistor is coupled to an output terminal of the bandgap circuit to provide the bandgap voltage, and a control terminal of the fifth transistor is coupled to the output terminal of the amplifier circuit;

a second resistor, wherein a first terminal of the second resistor is coupled to the second terminal of the fifth transistor, and a second terminal of the second resistor is coupled to a second input terminal of the amplifier circuit; and a sixth transistor, wherein a first terminal of the sixth transistor is coupled to the second terminal of the second resistor, a second terminal of the sixth transistor is coupled to a tenth voltage, and a control terminal of the sixth transistor is coupled to an eleven voltage.

18. The bandgap device according to claim 17, wherein the amplifier circuit comprises:

a seventh transistor, wherein a first terminal of the seventh transistor is coupled to a twelfth voltage, and a control terminal of the seventh transistor is coupled to a second terminal of the seventh transistor;

an eighth transistor, wherein a first terminal of the eighth transistor is coupled to the second terminal of the seventh transistor, and a control terminal of the eighth transistor is coupled to the first input terminal of the amplifier circuit;

a ninth transistor, wherein a first terminal of the ninth transistor is coupled to a thirteenth voltage, a second terminal of the ninth transistor is coupled to the output terminal of the amplifier circuit, and a control terminal of the ninth transistor is coupled to the second terminal of the seventh transistor;

a tenth transistor, wherein a first terminal of the tenth transistor is coupled to the second terminal of the ninth transistor, and a control terminal of the tenth transistor is coupled to the second input terminal of the amplifier circuit; and an eleventh transistor, wherein a first terminal of the eleventh transistor is coupled to a second terminal of the eighth transistor and a second terminal of the tenth transistor, a second terminal of the eleventh transistor is coupled to a fourteenth voltage, and a control terminal of the eleventh transistor is controlled by a third internal bias voltage.

19. The bandgap device according to claim 17, wherein the bandgap circuit further comprises:

a self-bias circuit, wherein an input terminal of the self-bias circuit is coupled to the output terminal of the amplifier circuit, and an output terminal of the self-bias circuit is coupled to a bias terminal of the amplifier circuit to provide a third internal bias voltage.

20. The bandgap device according to claim 19, wherein the self-bias circuit comprises:

a seventh transistor, wherein a first terminal of the seventh transistor is coupled to a twelfth voltage, a second terminal of the seventh transistor is coupled to the output terminal of the self-bias circuit, and a control terminal of the seventh transistor is coupled to the input terminal of the self-bias circuit; and an eighth transistor, wherein a first terminal of the eighth transistor is coupled to the second terminal of the seventh transistor, a second terminal of the eighth transistor is coupled to a thirteenth voltage, and a control terminal of the eighth transistor is coupled to the first terminal of the eighth transistor.

21. The bandgap device according to claim 20, wherein the first internal bias voltage and the second internal bias voltage are output voltages of the output terminal of the amplifier circuit, and the first internal start-up node is coupled to the second terminal of the seventh transistor and the first terminal of the eighth transistor.

22. The bandgap device according to claim 19, wherein the first internal bias voltage and the second internal bias voltage are the third internal bias voltages of the output terminal of the self-bias circuit, and the first internal startup node is coupled to the control terminal of the third transistor and the control terminal of the fifth transistor.

23. The bandgap device according to claim 17, wherein the first internal bias voltage and the second internal bias voltage are output voltages of the output terminal of the amplifier circuit, and the first internal startup node is coupled to the first terminal of the second resistor and the second terminal of the fifth transistor.

* * * * *